United States Patent Office
3,661,948
Patented May 9, 1972

3,661,948
CATALYTIC PREPARATION OF CARBOXYLIC ACID ESTERS FROM OLEFINS, ALCOHOLS AND CARBON MONOXIDE IN THE PRESENCE OF AN ALKYL ETHER AND AN ACTIVATOR AMOUNT OF WATER
Raymond A. Schell, Berkley, Mich., assignor to Ethyl Corporation, New York, N.Y.
No Drawing. Continuation-in-part of application Ser. No. 671,110, Sept. 27, 1967. This application Mar. 20, 1970, Ser. No. 21,474
Int. Cl. C07c 67/00, 51/14
U.S. Cl. 260—410.9 R    33 Claims

ABSTRACT OF THE DISCLOSURE

A process is described for preparing carboxylic acid esters from olefins, alcohols and carbon monoxide using a combination of tin or germanium salt; a platinum salt as the catalyst, an ether and an activator amount of water.

Olefins having from 8 to about 24 carbon atoms are preferred reactants. Alkyl ethers having up to 16 carbon atoms are useful.

The reaction rate is unexpectedly improved by the combination of alkylether and activator.

CROSS REFERENCE TO RELATED APPLICATION

This application is a continuation-in-part of Ser. No. 671,110, filed Sept. 27, 967, now abandoned.

BACKGROUND OF THE INVENTION

This invention is directed to an improved process for preparing carboxylic acid esters from olefins, carbon monoxide and alcohols.

The reaction of primary alcohols with olefins and carbon monoxide to produce esters is well known. There are a number of U.S. patents describing the use of various catalysts for this reaction, see for example, U.S. 2,542,767, U.S. 2,526,742, U.S. 2,557,256. An especially useful catalyst system is described in U.S. 2,876,254. The process therein described is directed to the reaction of olefins having up to six carbon atoms with carbon monoxide and an alcohol using as a catalyst a combination of a tin or germanium salt with a Group VIII metal salt. When higher molecular weight olefins such as dodecene are used in this process, the yield of ester product is low and the rate of reaction is poor.

It has been discovered that the rate of carboxylating higher molecular weight olefins using a catalyst of U.S. 2,876,254 is significantly increased by carrying the reaction out in the presence of ethers and a small amount of water as an activator.

SUMMARY OF THE INVENTION

A process for preparing carboxylic acid esters which comprises reacting an olefin having from about 2 to about 32 carbon atoms with carbon monoxide and an alcohol using a catalyst which is a combination of a salt of tin or germanium with a platinum salt in the presence of an alkyl ether and an activator amount of water.

DESCRIPTION OF THE PREFERRED EMBODIMENTS

An embodiment of this invention is a process for preparing carboxylic acid esters which comprises reacting a $C_2$–$C_{32}$ olefin characterized by (1) having at least one α-carbon-to-carbon double bond and (2) having a hydrogen on the 2 carbon atom of said α double bond with carbon monoxide and a $C_1$–$C_{24}$ alcohol in the presence of a catalyst which is a combination of an alcohol soluble salt of a metal selected from the class consisting of tin and germanium with platinum salts, an alkyl ether and an activator amount of $H_2O$. A preferred embodiment is the process described above in which the catalyst is a combination of (a) a tin or germanium halide with platinum halide salt or (b) a tin or germanium halide with alkali metal salt of a haloplatinum acid or (c) stannous chloride dihydrate and $K_2PtCl_6$, $K_2PtCl_4$, and the like. $C_1$–$C_{10}$ monohydroxy alkanols are preferred reactant alcohols. Alpha monoolefins are preferred olefins. Alkyl ethers having up to about 16 carbon atoms are preferred. A most preferred process is the catalytic process described above wherein methanol is the reactant alcohol and 1,2-dimethoxyethane is the ether.

Organic compounds which are useful reactants in the practice of this invention are olefins (1) having at least one alpha carbon-to-carbon double bond and (2) a hydrogen atom on the 2 carbon atoms of said α double bond. These olefins include mono unsaturates, that is, compounds having one α carbon-to-carbon double bond as well as polyunsaturates, that is, compounds having two or more carbon-to-carbon double bonds. Useful olefins may contain other functional groups such as hydroxy, halo, carboxy, nitro and the like. Examples of useful unsaturated organic compounds are 3-chlorooctene-1, 9-hydroxytetradecene-1, and the like. Preferred olefins are the hydrocarbon olefins. Examples of preferred olefins are octene-1, pentadecene-1, tetraisobutylene, cyclooctene, cyclooctadiene-1,5, dodecene-1, eicosene-1, nonene-1, octadecene-1 and the like. Most preferred olefins are the acrylic α olefins. Examples of preferred olefins are tetracosene-1, octadecadiene-1,3, undecadiene-1,4, and the like. Especially preferred hydrocarbon olefins are the α-monoolefins, that is, hydrocarbons having only one carbon-to-carbon double bond in the 1,2 position in the molecule. Examples of suitable α-monoolefins are ethylene, 4-methylpentene-1, butene-1, 3-methylbutene-1, octene-1, nonene-1, decene-1, tetradecene-1, dodecene-1, 5-ethylhexene-1, pentadecene-1, heptadecene-1, eicosene-1, and the like.

Commercial mixtures of olefins are also quite useful. These commercial mixtures are generally a mixture of various homologous olefins such as $C_4$, $C_6$, $C_8$ olefins; $C_5$, $C_7$, $C_9$, $C_{11}$ olefins; $C_{12}$, $C_{14}$, $C_{16}$ olefins; $C_{12}$, $C_{14}$ olefins; $C_{13}$, $C_{15}$, $C_{17}$ olefins; $C_{11}$, $C_{12}$, $C_{13}$, $C_{14}$, $C_{15}$ olefins; $C_{18}$, $C_{20}$, $C_{22}$ olefins; $C_{14}$, $C_{15}$ olefins; $C_{12}$, $C_{14}$, $C_{16}$, $C_{18}$, $C_{20}$, $C_{22}$, $C_{24}$, $C_{26}$, $C_{28}$ olefins, and the like. These mixed olefins are synthesized for example by the Ziegler catalyzed polymerization of low molecular weight olefins such as ethylene or propylene; or by the dehydrogenation of suitable paraffins. The mixed olefins thus obtained might also contain minor amounts of other non-homologous olefins and non-olefin components. In any case, the mixed product obtained from such a commercial synthesis need not be separated into the individual components to be useful. Mixtures of even carbon numbered predominantly α olefins in the $C_8$–$C_{32}$ range having an average molecular weight of $C_{12}$–$C_{14}$ are useful; $C_{10-28}$ range mixtures are particularly useful. Such mixtures containing $C_8$ to $C_{24}$ predominantly α-olefins are especially useful. By predominantly I mean that over 60% of the olefins are alpha.

Alcohols which are useful reactants include both aryl as well as alkyl hydroxy compounds. Examples of suitable aryl hydroxy compounds are benzyl alcohol, phenol, $C_1$ to $C_{18}$ alkyl phenols, and the like. The preferred alcohols are the alkyl hydroxy compounds having from 1 to about 10 carbon atoms wherein the alkyl group is composed solely of carbon and hydrogen. The term hydrocarbyl alkanols is used to describe these preferred alcohols. These hydrocarbyl alkanols include cyclic alcohols such as cyclohexanol, cyclopentanol and the like, as well as primary, secondary and tertiary alcohols such as 2-decanol, tert-butanol, 2-ethylhexanol-1 and the like.

The most preferred alcohols are the acyclic hydrocarbyl monohydroxy primary alkanols having from 1 to about 5 carbon atoms such as ethanol, pentanol-1, butanol and the like. Methanol is an especially preferred alcohol.

The catalysts which are used in effecting the reaction are in general a combination of alcohol soluble salts of tin or germanium with platinum salts. Preferred salts are halides wherein the halogen has an atomic number of at least 17. The chlorides are especially preferred. Specific examples of suitable salts of tin and germanium are stannous and stannic chlorides, bromides and iodides, germanium di- and tetrachlorides and germanium tetrabromides, tetraiodides and tetrafluorides, stannous and stannic sulfates and the like and their hydrates. Stannous chloride is preferred either anhydrous or hydrated.

Examples of suitable platinum salts are platinic chloride, platinous chloride, platinic bromide, platinous bromide, platinic iodide, platinous iodide, platinic sulfate, platinous nitrate, platinic phosphate and the like. Preferred platinum salts are the alkali metal salts of haloplatinum acids such as $K_2PtBr_4$, $Li_2PtCl_6 \cdot 6H_2O$, $Na_2PtBr_6 \cdot 6H_2O$, $Na_2PtI_4$, $Li_2PtCl_4$, $Na_2PtI_6$ and the like. Alkali metal salts and especially potassium and sodium salts of chloroplatinic acids are more preferred, e.g. $K_2PtCl_6$, $Na_2PtCl_4 \cdot 4H_2O$, $K_2PtCl_4$, $Na_2PtCl_6$.

An especially useful catalyst combination is $SnCl_2 \cdot 2H_2O$ and an alkali metal salt of a chloroplatinic acid such as $K_2PtCl_6$, or $Na_2PtCl_6$.

Special preparation of the catalysts does not appear to be required. In general, as set out in U.S. 2,876,254, the suitable metal salts are dissolved directly in the alcohol reactant which is being used in the carboxylation. Molar ratios of alcohol soluble tin or germanium salt to haloplatinic acid of from 1:1 to 20:1 can be used in the preparation of the catalysts. The amount of catalyst which can be employed can be varied widely, but is generally about 0.0001 to about 0.2 mole of contained platinum metal per mole of reactant alcohol charged into the reactor.

Alkyl ethers when used with an activator amount of water increase the rate of the carboxylation reaction. Typical alkyl ethers have from 4 to about 16 carbon atoms such as morpholine, diethyl ether, 1,4-dioxane, di-n-butylether, di-n-hexylether, di-2-ethylhexyl ether, $C_1$–$C_4$ dialkyl glycol ethers and polyethers such as 1,2-diethoxy ethane, bis[2(2-methoxyethoxy)ethyl], ether bis(2-butoxy ethyl)ether, 1,2-dipropoxy propane and the like. Mixtures of the ethers can also be used.

An especially preferred alkyl ether is 1,2-dimethoxy ethane.

As will be illustrated below these alkyl ethers in combination with water unexpectedly improve the rate of the catalytic carboxylation of $C_2$ and higher olefins and preferably $C_8$ and higher olefins to produce esters.

The amount of alkyl ether used ranges from about 10 percent to about 70 percent by weight of the total alcohol/olefin charge. Generally, 20 percent to about 60 percent by weight of the promoter can be used.

The action of the alkyl ether is not fully understood. Although not bound by any theory, it is thought that the ether may function as a complexing agent. Whatever the mechanism, the presence of the alkyl ether and the water unexpectedly improves the overall rate of the carboxylation reaction.

Water is an essential component in the present process. In other words, essentially no conversion of olefin, that is, no reaction of olefin, CO and alkanol to produce ester, will occur in the alkyl ether, Sn or Ge/Pt catalyzed system unless a sufficient amount of water is present. At least 10 moles of water per mole of platinum contained in the catalyst is needed to activate the system. The process can also be carried out in the presence of up to moderate amounts of water. Thus, for example, the reaction to produce esters will proceed when the catalyst components provide at least the minimum amount of water as water of hydration (e.g. $SnCl_2 \cdot 2H_2O$) or when the alcohol reactant contains sufficient water and the like. Excess amounts of water, that is, over about 90 moles of water per mole of contained platinum, should be avoided. A preferred range of water concentration is 16 to 84 moles of water per mole of platinum.

The temperature at which the reaction is carried out may vary over a wide range. In general, temperatures in excess of about 30° C. are used. The temperature range of from about 30° C. to about 325° C. may be employed. Temperatures from about 50° C. to about 275° C. are conveniently used. Temperatures ranging from about 70° C. to about 120° C. are preferred. The process may be carried out under pressure ranging from 500 to about 10,000 pounds per square inch (p.s.i.). Reaction pressures of from about 750 to about 5,000 p.s.i. are conveniently used.

The product obtained in the present carboxylation process is a mixture of ester isomers. This is illustrated by the following reaction equation:

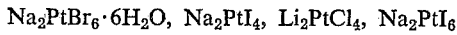
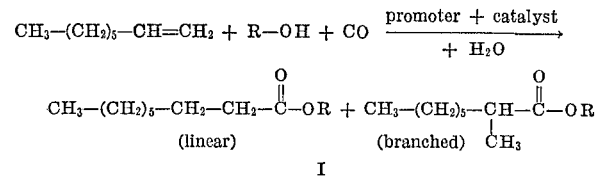

I

The product obtained thus, is a mixture of linear and branched esters. The major product obtained in the present process is the linear ester. By major product I mean more than about 60 percent by weight of the ester mixture is the linear ester.

This mixture of ester isomers may be separated if desired by any suitable separation methods such as by fractional distillation, by selective absorption, and the like. The mixture of esters may likewise be used as such without any separation of isomers.

As the examples which follow will show, by using the ether and $H_2O$ the rate of the carboxylation reaction is increased substantially. In the following examples, mmoles stands for millimoles.

EXAMPLE 1

Ether; substantially water free

A suitable sized autoclave was charged with 90 mmoles of dodecene-1, 490 mmoles of methanol, about 26 grams of 1,2-dimethoxy ethane, 1.0 gram of $K_2PtCl_6$ (anhydrous) and 1.9 grams of $SnCl_2$ (anhydrous). Carbon monoxide was introduced into the autoclave to a pressure of 2750 p.s.i. The reaction mass was heated to 90° C. with stirring. Carbon monoxide was then added to a total pressure of 3200 p.s.i. The reaction was continued at this temperature for 1 hour. During this time a total pressure drop of 25 p.s.i. was recorded. The reaction mass was cooled to room temperature and the autoclave was vented; 58.3 grams of liquid product was obtained. Analysis of the product by vapor phase chromatography showed that no olefin conversion had occurred.

EXAMPLE 2

Ether; activator water added

A suitably sized autoclave was charged with 90 mmoles of dodecene-1, 485 mmoles of methanol, about 26 grams of 1,2-dimethoxy ethane, 1.0 gram of $K_2PtCl_6$ (anhydrous), 1.9 grams of $SnCl_2$ (anhydrous) and 33 mmoles of water. Carbon monoxide was introduced to a pressure of 2750 p.s.i. The reaction mass was heated to 3175 p.s.i. The reaction was continued at this temperature for 1 hour, a pressure drop of 175 p.s.i. being recorded. The reaction mass was cooled to room temperature and the autoclave was vented; 60.4 grams of a liquid product was obtained. Analysis of this product by vapor phase chromatography showed that the conversion of olefin was 32 percent and the yield of methyl tridecanoates based on the conversion, was 72 percent, of which 86 percent was the linear ester.

EXAMPLE 3
Ether; water to hydration as activator

A suitably sized autoclave was charged with 92 mmoles of dodecene-1, 428 mmoles of methanol, 28.9 grams of 1,2-dimethoxy ethane, 1 gram of $K_2PtCl_6$ and 2.3 grams of $SnCl_2 \cdot 2H_2O$ (the hydrate contains about 33 mmoles of $H_2O$). Carbon monoxide was introduced to a pressure of 2000 p.s.i. The reaction mass was heated to 90° C. and carbon monoxide was added to a total pressure of 3000 p.s.i. The reaction was continued for one hour. A pressure drop of 300 p.s.i. was recorded. The reaction mass was cooled to room temperature and the autoclave was vented; 64.4 grams of liquid product was obtained. Analysis of the product by vapor phase chromatography showed that olefin conversion was 72 percent. The yield of methyl tridecanoates was 98 percent, of which 85 percent was the linear ester.

The improvement in rate of reaction and the necessity of activator water is clearly illustrated by the examples set out above. Example 1 shows that essentially no reaction occurred when dodecene-1 was heated for 1 hour at 90° C. in an autoclave with CO and methanol in the presence of mixed tin/platinum catalyst and an ether.

Using the same reactant system and ether promoter as in Example 1, but adding an activator amount of water ($H_2O:Pt$ molar ratio of 16:1) 32 percent of the dodecene-1 was converted, i.e., reacted after one hour at 90° C. (Example 2). Thus, in Example 1 there was essentially no reaction of dodecene-1 with methanol and CO using a thin/platinum catalyst in the presence of an ether. By adding a small amount of water to the same reactants under substantially the same conditions as in Example 1, 32 percent of dodecene-1 reacted to produce methyl tridecanoates (Example 1). Example 3 shows that providing the water as water of hydration ($SnCl_2 \cdot 2H_2O$) causes 71 percent of the dodecene-1 to react. Thus, Examples 1–3 clearly show that a small amount of water is required to activate the reaction of an olefin, CO and alcohol to produce esters in the presence of an ether.

The following table contains data for a series of examples of the carboxylation process in which an ether and water are used. In each case, where the analogous reaction is run without an activator amount of water, essentially no carboxylation occurs or if it does occur, the rate is substantially lower.

The ester products of the present reaction have many uses in the chemical field. For example, the esters may be used as solvents; as plasticizers for resins such as polyvinylchloride, and the like; as chemical intermediates in ester interchange reactions. The esters may also be hydrolyzed to yield acids which are useful as detergent intermediates. The tin or germanium salts used as catalysts in the present invention are, in general, soluble in alchol. Some of the useful platinum salts are also soluble in alcohol. Soluble in alcohol means soluble in a lower alkanol such as ethanol, methanol, isopropanol and the like. Salts of tin or germanium and platinum salts which are not soluble in alcohol but which are soluble in the olefin, the ether and/or the activator amount of water present can also be used. On the other hand, tin or germanium salts and platinum salts which are not soluble in any component of the reaction system can also be used. In this case, the combination of tin or germanium salts and noble metal acids may be dispersed directly in the reaction system using methods known in the art; or the catalyst metal salts and noble metal acids may be used deposited on an inert support.

The process of this invention is properly described above. The examples presented serve to illustrate, but are not meant to limit this invented process. It is intended that this invention be limited only within the scope of the following claims.

I claim:
1. A process for preparing carboxylic acid esters which comprises reacting $C_2$–$C_{32}$ olefin, characterized by having
   (A) at least one alpha carbon-to-carbon double bond, and
   (B) a hydrogen on the 2-carbon atom of said α-double bond, with carbon monoxide and a $C_1$–$C_{24}$ alcohol reactant at an olefin:alcohol reactant ratio of 1:1 to 1:10 in the presence of
      (a) from 0.0001 to 0.2 mole of contained platinum metal per mole of alcohol reactant, of a catalyst which is a combination of
         (i) an alcohol soluble salt of a metal selected from tin and germanium, and
         (ii) a salt of platinum wherein the molar ratio of said salt(i) : said platinum salt(ii) is from 1:1 to 20:1, and
      (b) from 10% to about 70% by weight, based on the total olefin/alcohol reactant, of an alkyl ether having from 4 to about 16 carbon atoms, and up to 6 —O— groups, and
      (c) an activator amount of water, said activator

TABLE 1

| Olefin (moles) | Alcohol (moles) | Catalyst (parts:parts)[1] | $H_2O:Pt$ (mole ratio) | CO pressure (p.s.i.) | Reaction temperature (° C.) | Alkyl ether (weight percent)[2] | Major ester product[3] |
|---|---|---|---|---|---|---|---|
| Ethylene (1) | Ethanol (1) | $GeCl_4:H_2PtCl_4$ (5:1) | 10:1 | 1,500 | 50 | 1,2-dipropoxy propane (50) | Ethyl propionate. |
| Pentadecene-1 (1) | Tert-butanol (2) | $GeBr_4:H_2PtBr_4$ (20:1) | 90:1 | 6,000 | 85 | Diethyl ether (40) | Tert-butyl-hexadecanoate. |
| Dotriacontene-1 (1) | n-Hexanol (1.5) | $GeCl_4:H_2PtI_6$ (6:1) | 30:1 | 2,500 | 150 | Diisoamyl ether (10) | n-Hexyl-tri-tri-acontanoate. |
| Hexadecadiene-1,4 (1) | Isopropanol (10) | $GeCl_4:H_2PtI_4$ (2:1) | 75:1 | 4,500 | 75 | Tetrahydrofuran (60) | Isopropyl heptadecanoate. |
| Nonadecene-1 (1) | 2-ethyl-n-hexanol (8) | $SnCl_2:H_2PtBr_6$ (1:1.1) | 50:1 | 2,100 | 110 | Ethyl amyl ether (70) | 2-ethyl-n-hexyl eicosanoate. |
| Tetracosene-1 (1) | n-Decanol (6.5) | $GeCl_4:H_2PtCl_6$ (2.5:1) | 15.1 | 3,600 | 100 | 1,2-bis[2-(2-butoxy-ethoxy)ethoxy]-ethane (20) | n-Decyl pentacosanoate. |
| Heptadecene-1 (1) | Cyclohexanol (4) | $SnCl_2:H_2PtBr_4$ (1:1.5) | 25:1 | 750 | 96 | 1,2-dimethoxy ethane (44) | Cyclohexyl octadecanoate. |
| Octadiene-1,7 | n-Butanol (3.5) | $SnBr_2:H_2PtBr_6$ (1:0.1) | 45:1 | 3,000 | 120 | Bis[2-(2-ethoxy-ethoxy)ethyl]-ether (56) | di-n-Butyl sebacate.[4] |
| Octadecene-1 (1) | 2-pentanol (9) | $SnSO_4:H_2PtI_6$ (6:1) | 86:1 | 1,000 | 70 | 1,3-Dioxane (32) | 1-methyl-n-butyl nonadecanoate. |
| Pentene-1 (1) | 4-nonanol (5) | $SnCl_4:H_2PtCl_4$ (3:1) | 20:1 | 10,000 | 82 | Bis(2-butoxyethyl)-ether (66) | 1-propyl-n-hexyl hexanoate. |

[1] Weight ratio; also either or both catalyst components may be hydrated or non-hydrated.
[2] Based on total reactant charge.
[3] Branched isomers are also produced as illustrated in Equation I.
[4] n.Butyl nonanoate, unsaturated esters are also produced.

amount ranging from at least 10 and not over about 90 moles of water per mole of contained platinum in said catalyst.

2. The process of claim 1 wherein said activator amount is from at least 10 to 90 moles of water per mole of contained platinum in said catalyst.

3. The process of claim 2 wherein said alcohol reactant is a $C_1$–$C_{10}$ alkanol.

4. The process of claim 3 wherein said alkanol is a $C_1$–$C_5$ monohydroxy primary alkanol.

5. The process of claim 4 where said alkanol is methanol.

6. The process of claim 1 wherein the molar ratio of olefin:alcohol reactant is from 1:1 to about 1:6.

7. The process of claim 6 wherein said olefin:alcohol molar ratio is 1:2 to about 1:6.

8. The process of claim 1 wherein the reaction temperature is from about 50° C. to about 275° C. and the reaction pressure is from about 500 to about 10,000 pounds per square inch.

9. The process of claim 8 wherein said reaction temperature is from about 70° C. to about 120° C. and said reaction pressure is from about 750 to 5000 pounds per square inch.

10. The process of claim 9 wherein said olefin:alcohol reactant ratio is 1:1 to about 1:6 and said alcohol reactant is a $C_1$–$C_{10}$ alkanol.

11. The process of claim 10 wherein said alkanol is a $C_1$–$C_5$ monohydroxy alkanol.

12. The process of claim 10 wherein said alcohol soluble salt is a halide of tin or germanium and said salt of platinum is a halide of platinum.

13. The process of claim 10 wherein said alcohol soluble salt is a tin or germanium halide and said salt of platinum is an alkali metal salt of a haloplatinum acid.

14. The process of claim 1 wherein said alcohol soluble salt is a halogen salt of tin or germanium.

15. The process of claim 14 wherein said alcohol soluble salt is a halogen salt of tin.

16. The process of claim 13 wherein said platinum salt is a platinum halide.

17. The process of claim 13 wherein said platinum salt is an alkali metal salt of a haloplatinum acid.

18. The process of claim 1 wherein said olefin is a monoolefin.

19. The process of claim 18 wherein said alcohol reactant is a $C_1$–$C_{10}$ alkanol.

20. The process of claim 19 wherein said alcohol soluble salt is a halide of tin or germanium and said platinum salt is a platinum halide.

21. The process of claim 19 wherein said alcohol soluble salt is a halide of tin or germanium and said platinum salt is an alkali metal salt of a haloplatinum acid.

22. The process of claim 19 wherein said alkanol is a $C_1$–$C_5$ monohydroxy alkanol and said ether is $C_1$–$C_4$ dialkyl glycol ether.

23. The process of claim 20 wherein said alkanol is a $C_1$–$C_5$ monohydroxy alkanol and said ether is $C_1$–$C_4$ dialkyl glycol ether.

24. The process of claim 21 wherein said ether is 1,2-dimethoxyethane and said alkanol is methanol.

25. The process of claim 22 wherein said ether is 1,2-dimethoxyethane and said alkanol is methanol.

26. The process of claim 8 wherein said olefin is $C_8$–$C_{24}$ olefin, said alcohol reactant is $C_1$–$C_{10}$ monohydroxy alkanol, said olefin:alcohol reactant molar ratio is 1:1 to about 1:6, and said alcohol soluble salt is a halide of germanium or tin, and said activator amount of water is at least 10 moles of water per mole of platinum in the catalyst.

27. The process of claim 26 wherein said olefin is an α-monoolefin.

28. The process of claim 26 wherein said platinum salt is selected from platinum halides and alkali metal salts of haloplatinum acids.

29. The process of claim 28 wherein said platinum salt is alkali metal salt of haloplatinum acids.

30. The process of claim 28 wherein said alkanol is a $C_1$–$C_5$ monohydroxy alkanol and said ether is $C_1$–$C_4$ dialkyl glycol ether.

31. The process of claim 30 wherein said alkanol is methanol.

32. The process of claim 31 wherein said ether is 1,2-dimethoxyethane.

33. The process of claim 32 wherein said olefin is dodecane.

References Cited

UNITED STATES PATENTS

| | | | |
|---|---|---|---|
| 2,876,254 | 3/1959 | Jenner et al. | 260—486 |
| 2,916,513 | 12/1959 | Lautenschlager et al. | 260—486 |
| 2,962,525 | 11/1960 | Johnson et al. | 260—486 |

LEWIS GOTTS, Primary Examiner

D. G. RIVERS, Assistant Examiner

U.S. Cl. X.R.

260—408, 410, 410.5, 468 CB, 479 R, 485 R, 486 AC, 497 A